United States Patent
Wang et al.

(10) Patent No.: US 10,210,046 B2
(45) Date of Patent: Feb. 19, 2019

(54) METHOD THEREOF COMPUTER SYSTEM AND CONTROL METHOD THEREOF

(71) Applicants: Inventec (Pudong) Technology Corporation, Shanghai (CN); INVENTEC CORPORATION, Taipei (TW)

(72) Inventors: Chien-Chih Wang, Taipei (TW); Yung-Sheng Chiang, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 141 days.

(21) Appl. No.: 15/468,137

(22) Filed: Mar. 24, 2017

(65) Prior Publication Data
US 2018/0150358 A1     May 31, 2018

(30) Foreign Application Priority Data
Nov. 25, 2016    (CN) .......................... 2016 1 1055458

(51) Int. Cl.
*G06F 11/14*     (2006.01)
*G06F 9/44*      (2018.01)
*G06F 9/4401*    (2018.01)

(52) U.S. Cl.
CPC ........ *G06F 11/1417* (2013.01); *G06F 9/4401* (2013.01); *G06F 11/142* (2013.01); *G06F 11/1441* (2013.01)

(58) Field of Classification Search
CPC .. G06F 11/1417; G06F 9/4401; G06F 11/142; G06F 11/1441
See application file for complete search history.

(56) References Cited

U.S. PATENT DOCUMENTS

| 6,625,729 | B1* | 9/2003 | Angelo | G06F 9/4401 711/E12.1 |
| 6,675,295 | B1* | 1/2004 | Marcelais | G06F 11/1441 713/1 |
| 7,962,795 | B2* | 6/2011 | Kwon | G06F 11/1417 714/36 |

* cited by examiner

*Primary Examiner* — Stefan Stoynov
(74) *Attorney, Agent, or Firm* — CKC & Partners Co., Ltd.

(57) ABSTRACT

A computer system includes a memory unit and a processing unit. The memory unit is configured to store a default setting value with an image file form. The processing unit is electrically connected to the memory unit, and configured to read the default setting value with the image file form from the memory unit. When the computer system is unable to be activated, the processing unit is configured to trigger the computer system to activate a safe mode of a basic input/output system, and to compare the default setting value with a system setting value of the computer system to generate a comparison result, so as to adjust and reactivate the computer system according to the comparison result.

8 Claims, 3 Drawing Sheets

METHOD THEREOF COMPUTER SYSTEM AND CONTROL METHOD THEREOF

RELATED APPLICATIONS

This application claims priority to Chinese Application Serial Number 201611055458.2, filed Nov. 25, 2016, which is herein incorporated by reference.

BACKGROUND

Field of Invention

The present disclosure relates to a data processing system and a data processing method. More particularly, the present disclosure relates to a computer system and a control method thereof.

Description of Related Art

With the rapid development of computer technology, a computer system is widely applied in human life and playing an increasingly important role. Currently, when a user has to adjust a system setting value of a computer system according to his/her operational requirements, the user must actively activate and enter a setting menu of a basic input/output system (BIOS) to adjust the system setting value. However, this manner of adjusting system setting value by manpower may result in an error of inputting a wrong system setting value due to human error, so as to result in incapability of a computer system to operate. Although the condition mentioned above can be found to correct a wrong system setting value by a sequential comparison manner via manpower, but this manner may result in dramatic manpower consumption.

Accordingly, a significant challenge is related to ways in which to effectively remain operations of a computer system while at the same time decreasing manpower consumption associated with designing computer systems and control methods.

SUMMARY

An aspect of the present disclosure is directed to a computer system. The computer system includes a memory unit and a processing unit. The memory unit is configured to store a default setting value with an image file form. The processing unit is electrically connected to the memory unit, and configured to read the default setting value with the image file form from the memory unit. When the computer system is unable to be activated, the processing unit is configured to trigger the computer system to activate a safe mode of a basic input/output system, and to compare the default setting value with a system setting value of the computer system to generate a comparison result, so as to adjust and reactivate the computer system according to the comparison result.

Another aspect of the present disclosure is directed to a control method of a computer system. The control method includes steps as follows: storing a default setting value with an image file form via a memory unit; reading the default setting value with the image file form from the memory unit via a processing unit; when the computer system is unable to be activated, triggering the computer system to activate a safe mode of a basic input/output system, and comparing the default setting value with a system setting value of the computer system to generate a comparison result via the processing unit; and adjusting and reactivating the computer system according to the comparison result via the processing unit.

It is to be understood that the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
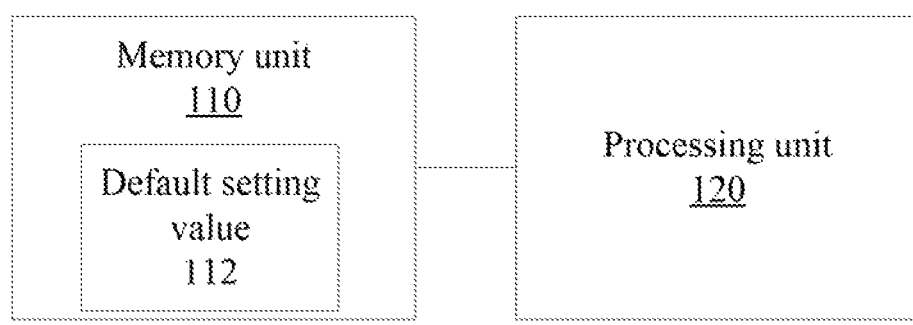
FIG. 1 is a block schematic diagram of a computer system according to embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a block schematic diagram of a computer system 100 according to embodiments of the present disclosure. As shown in FIG. 1, the computer system 100 includes a memory unit 110 and a processing unit 120, and the processing unit 120 is electrically connected to the memory unit 110. The memory unit 110 is configured to store a default setting value 112 with an image file form. The processing unit 120 is configured to read the default setting value 112 with the image file form from the memory unit 110.

In one embodiment, when the computer system 100 is unable to be activated, the processing unit 120 is configured to trigger the computer system 100 to activate a safe mode of a basic input/output system, and to compare the default setting value 112 with a system setting value of the computer system 100 to generate a comparison result. Subsequently, the processing unit 120 adjusts and reactivates the computer system according to the comparison result. For example, the processing unit 120 can automatically test the computer system 100 to eliminate factors which result in incapability of the computer system 100 to be activated, so that the computer system 100 can operate after reactivating.

In one embodiment, the processing unit 120 is configured to generate the comparison result according to a difference between the default setting value 112 and the system setting value of the computer system 100. For example, the system setting value of the computer system 100 can represent system setting values of a basic input/output system, the default setting value 112 can represent initial system setting values of the computer system 100, and the initial system setting values is configured to support the computer system 100 to ensure that the computer system 100 can be able to be activated. Accordingly, the processing unit 120 can sequentially compare each setting items of the default setting value 112 with that of the system setting value, so as to determine and output the difference between the default setting value 112 and the system setting value as the comparison result.

In another embodiment, the processing unit 120 is configured to output the difference between the default setting value 112 and the system setting value via the safe mode of the basic input/output system. For example, the processing unit 120 can output the difference between the default setting value 112 and the system setting value to a displayer of the computer system 100 via the safe mode of the basic input/output system, thus a user can check the difference between the default setting value 112 and the system setting value via the displayer, so that the user can actively select setting items of the system setting value which have to be replaced by the default setting value 112 to eliminate factors which result in incapability of the computer system 100 to be activated.

In further embodiment, the processing unit 120 is configured to replace the system setting value of the computer system 100 with the default setting value 112 according to the comparison result, so as to reactivate the computer system 100. For example, the processing unit 120 can replace the system setting value with the default setting value 112 according to the difference between the default setting value 112 and the system setting value correspondingly, so as to generate a new system setting value. Subsequently, the processing unit 120 reactivates the computer system 100 according to the new system setting value. In other words, the processing unit 120 can replace the system setting value by a manner of entirely replacing the system setting value with the default setting value 112, or by a manner which a user actively selects setting items of the system setting value which have to be replaced by the default setting value 112.

In one embodiment, the safe mode of the basic input/output system includes executive procedures and an operational interface which are different from executive procedures and an operational interface of a basic input/output system of the normal computer system 100. For example, when the computer system 100 is unable to be activated, the processing unit 120 triggers the computer system 100 to activate the safe mode of the basic input/output system, and compares the default setting value 112 with the system setting value of the computer system 100, so as to output the difference between the default setting value 112 and the system setting value of the computer system 100 to the operational interface of the safe mode of the basic input/output system. In another embodiment, the processing unit 120 can display the difference between the default setting value 112 and the system setting value on the operational interface of the safe mode of the basic input/output system by a manner of comparing each setting items, and different setting items between the default setting value 112 and the system setting value can be exhibited by obvious marks.

Figure 2A:
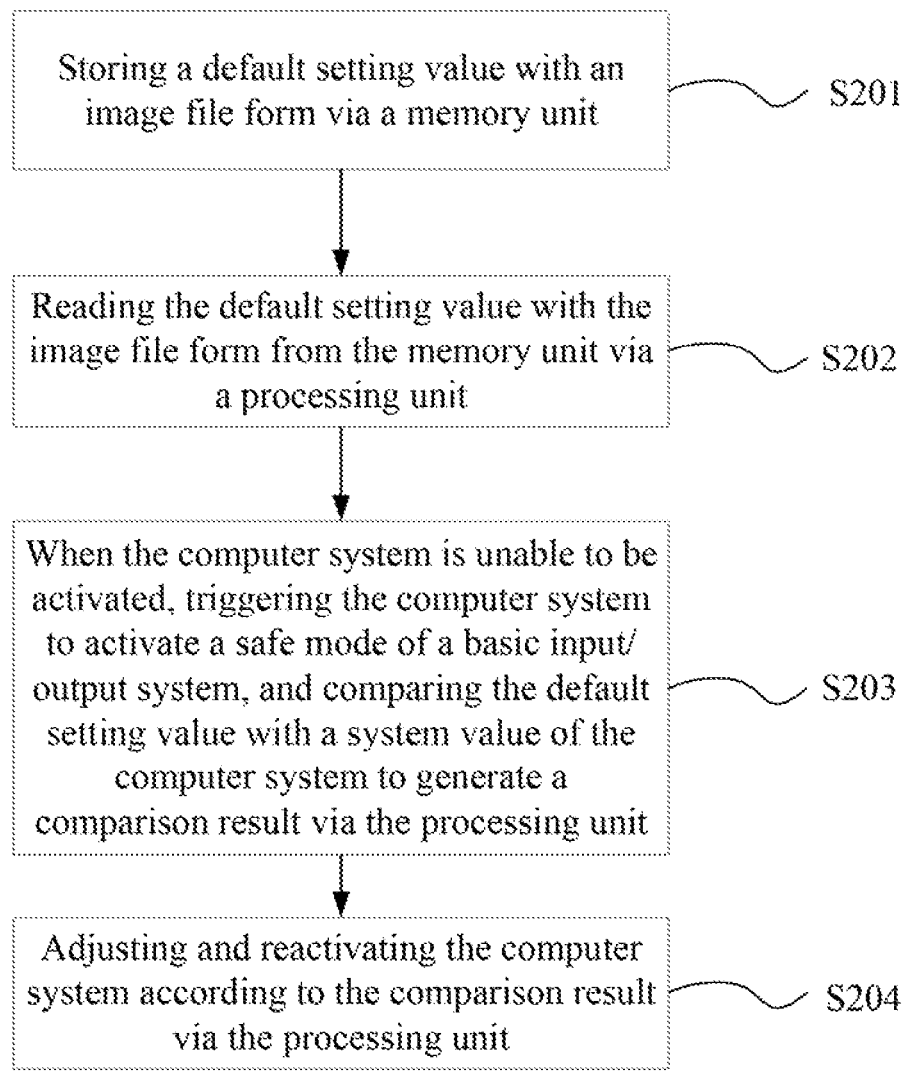
FIG. 2A and FIG. 2B are flow charts of control methods of a computer system according to embodiments of the present disclosure.

FIG. 2A is a flow chart of a control method 200A of a computer system according to embodiments of the present disclosure. In one embodiment, the control method 200A can be implemented by the computer system 100 mentioned above, but the present disclosure is not limited thereto. For facilitating of understanding the control method 200A, the computer system 100 mentioned above is used as an example for illustrating the control method 200A as follows. As shown in FIG. 2A, the control method 200A includes steps as follows:

S201: storing a default setting value 112 with an image file form via the memory unit 110;

S202: reading the default setting value 112 with the image file form from the memory unit 110 via the processing unit 120;

S203: when the computer system 100 is unable to be activated, triggering the computer system 100 to activate a safe mode of a basic input/output system, and comparing the default setting value 112 and a system setting value of the computer system 100 to generate a comparison result via the processing unit 120; and S204: adjusting and reactivating the computer system 100 according to the comparison result comparison result via the processing unit 120.

In one embodiment, when the computer system 100 is unable to be activated, the computer system 100 can execute self-test to generate the comparison result according to the default setting value 112, and to adjust and reactivate the computer system 100 according to the comparison result via the processing unit 120. In other words, the computer system 100 which applies the control method 200A can automatically execute the self-test to eliminate factors which result in incapability of the computer system 100 to be activated, so that the computer system 100 can operate after reactivating.

In one embodiment, reference is now made to the step S202. The computer system 100 can generate the comparison result according to a difference between the default setting value 112 and the system setting value via the processing unit 120. For example, the system setting value of the computer system 100 can represent system setting values of a basic input/output system, the default setting value 112 can represent initial system setting values of the computer system 100, and the initial system setting values is configured to support the computer system 100 to ensure that the computer system 100 can be able to be activated. Accordingly, the computer system 100 can sequentially compare each setting items of the default setting value 112 with that of the system setting value, so as to determine and output the difference between the default setting value 112 and the system setting value as the comparison result via the processing unit 120.

In another embodiment, the computer system 100 can output the difference between the default setting value 112 and the system setting value via the safe mode of the basic input/output system. For example, the computer system 100 can output the difference between the default setting value 112 and the system setting value to a displayer of the computer system 100 via the safe mode of the basic input/output system, thus a user can check the difference between the default setting value 112 and the system setting value via the displayer, so that the user can actively select setting items of the system setting value which have to be replaced by the default setting value 112 to eliminate factors which result in incapability of the computer system 100 to be activated.

In further embodiment, reference is now made to the step S203. The computer system 100 can replace the system setting value of the computer system 100 with the default setting value 112 according to the comparison result, so as to reactivate the computer system 100 via the processing unit 120. For example, the computer system 100 can replace the system setting value with the default setting value 112 according to the difference between the default setting value 112 and the system setting value correspondingly, so as to generate a new system setting value via the processing unit 120. Subsequently, the computer system 100 can be reactivated according to the new system setting value. In other words, the computer system 100 can replace the system setting value by an entire replacement manner, or by a manner which a user actively selects setting items of the system setting value which have to be replaced by the default setting value 112 via the processing unit 120.

In one embodiment, the safe mode of the basic input/output system includes executive procedures and an operational interface which are different from executive procedures and an operational interface of a basic input/output system of the normal computer system 100. For example, when the computer system 100 is unable to be activated, the processing unit 120 can trigger the computer system 100 to activate the safe mode of the basic input/output system, and compare the default setting value 112 with the system setting value of the computer system 100, so as to output the difference between the default setting value 112 and the system setting value of the computer system 100 to the operational interface of the safe mode of the basic input/output system. In another embodiment, the processing unit 120 can display the difference between the default setting value 112 and the system setting value on the operational interface of the safe mode of the basic input/output system by a manner of comparing each setting items, and different setting items between the default setting value 112 and the system setting value can be exhibited by obvious marks.

Figure 2B:
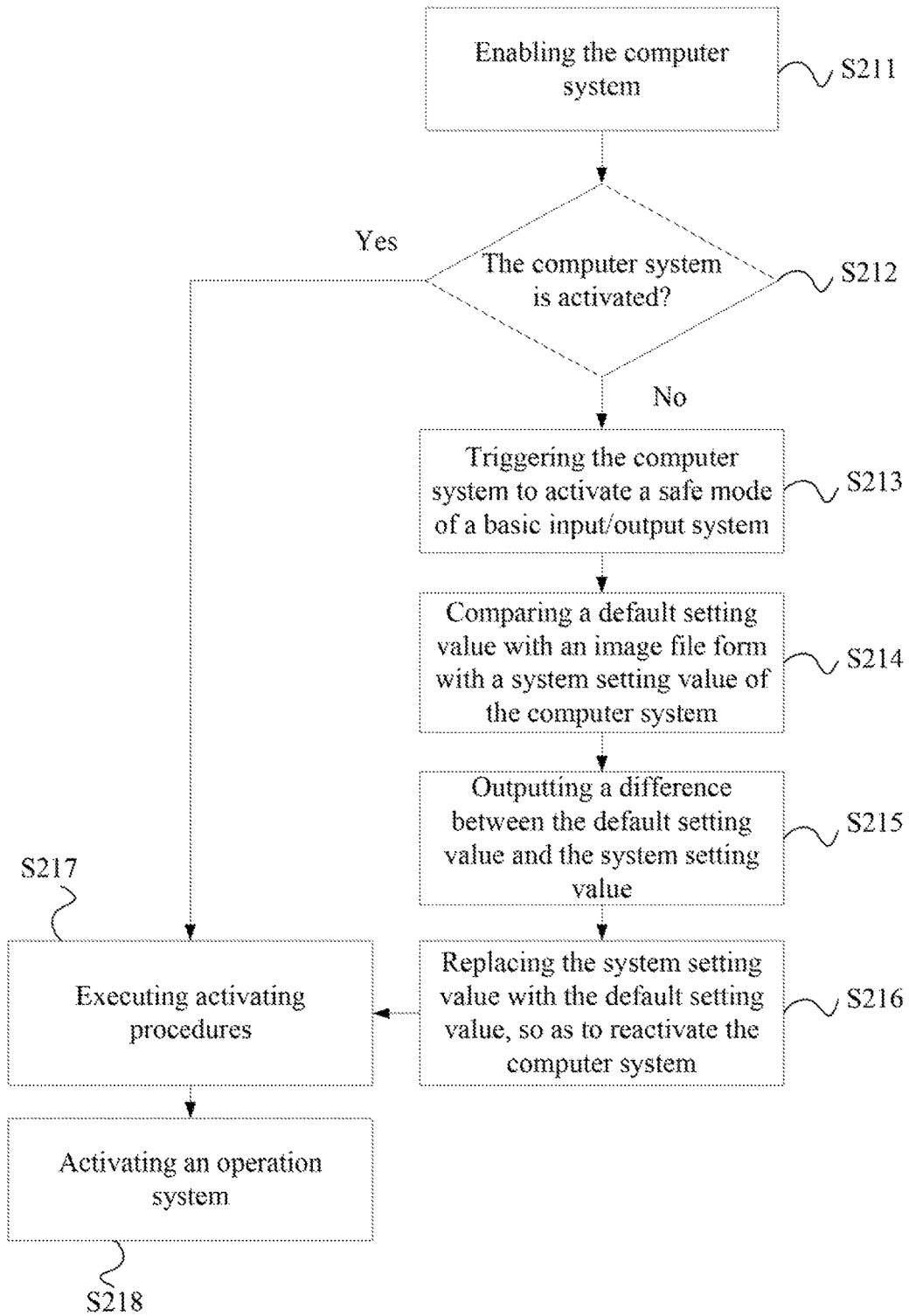

For explaining and illustrating how to integrate the control method 200A with the embodiments mentioned above and apply them to the computer system 100 in detail, reference is now made to FIG. 2B. FIG. 2B is a flow chart of a control method 200B of a computer system according to embodiments of the present disclosure. In one embodiment, the control method 200B can be implemented by the computer system 100 mentioned above, but the present disclosure is not limited thereto. For facilitating of understanding the control method 200B, the computer system 100 mentioned above is used as an example for illustrating the control method 200B as follows. As shown in FIG. 2B, the control method 200B includes steps as follows, step S211: enabling the computer system 100; step S212: determining whether the computer system 100 is activated; step S213: according to the step S212, when the computer system 100 is unable to be activated, triggering the computer system 100 to activate a safe mode of a basic input/output system via the processing unit 120; step S214: comparing the default setting value 112 with an image file form with a system setting value of the computer system 100 via the processing unit 120. For example, the system setting value of the computer system 100 can represent system setting values of a basic input/output system, the default setting value 112 can represent initial system setting values of the computer system 100, and the initial system setting values is configured to support the computer system 100 to ensure that the computer system 100 can be able to be activated.

Reference is now made to the step S214 of the control method 200B, the control method 200B further includes steps as follow, step S215: outputting a difference between the default setting value 112 and the system setting value via the safe mode of the basic input/output system; step S216: replacing the system setting value with the default setting value 112, so as to reactivate the computer system 100 via the processing unit 120; step S217: according to the step S212, when the computer system 100 is activated or is reactivated via the processing unit 120, the computer system 100 executes subsequent activating procedures; and step S218: the computer system 100 activates an operational system. For example, the computer system 100 can sequentially compare each setting items of the default setting value 112 with that of the system setting value, so as to determine and output the difference between the default setting value 112 and the system setting value via the processing unit 120. Additionally, the computer system 100 can replace the system setting value by an entire replacement manner, or by a manner which a user actively selects setting items of the system setting value which have to be replaced by the default setting value 112 via the processing unit 120.

In the embodiments mentioned above, the computer system and the control method of the present disclosure automatically test the computer system according to the default setting value to adjust the computer system to eliminate factors which result in incapability of the computer system to be activated, so as to reactivate the computer system via the processing unit. For example, the processing unit can compare the default setting value with the system setting value of the computer system, so as to determine the difference between the default setting value and the system setting value of the computer system to adjust the system setting value of the computer system. Accordingly, the computer system and the control method of the present disclosure can automatically test the computer system to eliminate the factors which result in the incapability of the computer system to be activated, so as to effectively remain operations of the computer system and dramatically decrease manpower consumption.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present invention cover modifications and variations of this present disclosure provided they fall within the scope of the following claims.

What is claimed is:
1. A computer system, comprising:
   a memory unit, configured to store a default setting value with an image file form; and
   a processing unit, electrically connected to the memory unit, and configured to read the default setting value with the image file form from the memory unit, wherein when the computer system is unable to be activated, the processing unit is configured to trigger the computer system to activate a safe mode of a basic input/output system, and to compare the default setting value with a system setting value of the computer system to generate a comparison result, so as to adjust and reactivate the computer system according to the comparison result.

2. The computer system of claim 1, wherein the processing unit is configured to generate the comparison result according to a difference between the default setting value and the system setting value.

3. The computer system of claim 2, wherein the processing unit is configured to output the difference between the default setting value and the system setting value via the safe mode of the basic input/output system.

4. The computer system of claim 2, wherein the processing unit is configured to replace the system setting value of the computer system with the default setting value according to the comparison result, so as to reactivate the computer system.

5. A control method of a computer system, comprising:
   storing a default setting value with an image file form via a memory unit;
   reading the default setting value with the image file form from the memory unit via a processing unit;
   when the computer system is unable to be activated, triggering the computer system to activate a safe mode of a basic input/output system, and comparing the default setting value with a system setting value of the computer system to generate a comparison result via the processing unit; and
   adjusting and reactivating the computer system according to the comparison result via the processing unit.

6. The control method of claim 5, wherein when the computer system is unable to be activated, triggering the computer system to activate the safe mode of the basic input/output system, and comparing the default setting value with the system setting value of the computer system to generate the comparison result via the processing unit comprises:
   generating the comparison result according to a difference between the default setting value and the system setting value via the processing unit.

7. The control method of claim 6, wherein when the computer system is unable to be activated, triggering the computer system to activate the safe mode of the basic input/output system, and comparing the default setting value with the system setting value of the computer system to generate the comparison result via the processing unit comprises:
   outputting the difference between the default setting value and the system setting value via the safe mode of the basic input/output system.

8. The control method of claim 6, wherein adjusting and reactivating the computer system according to the comparison result via the processing unit comprises:
   replacing the system setting value with the default setting value according to the comparison result, so as to reactivate the computer system via the processing unit.

* * * * *